(12) United States Patent
Lee

(10) Patent No.: US 7,366,986 B2
(45) Date of Patent: Apr. 29, 2008

(54) APPARATUS FOR RECEIVING MPEG DATA, SYSTEM FOR TRANSMITTING/RECEIVING MPEG DATA AND METHOD THEREOF

(75) Inventor: Sang-rae Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 10/305,185

(22) Filed: Nov. 27, 2002

(65) Prior Publication Data

US 2003/0123542 A1    Jul. 3, 2003

(30) Foreign Application Priority Data

Dec. 27, 2001  (KR)  ............... 2001-0086187

(51) Int. Cl.
*G06F 3/00* (2006.01)
*G06F 9/00* (2006.01)
*G06F 17/00* (2006.01)

(52) U.S. Cl. ............... 715/716; 715/719; 715/745; 345/501

(58) Field of Classification Search ........... 375/240.08; 715/747, 716, 719
See application file for complete search history.

(56) References Cited

U.S. PATENT DOCUMENTS

| | | | |
|---|---|---|---|
| 6,185,602 B1 * | 2/2001 | Bayrakeri ............... | 709/204 |
| 6,535,919 B1 * | 3/2003 | Inoue et al. ............ | 709/229 |
| 6,557,041 B2 * | 4/2003 | Mallart ................. | 709/231 |
| 6,631,403 B1 * | 10/2003 | Deutsch et al. .......... | 709/217 |
| 6,766,355 B2 * | 7/2004 | Liang et al. ............ | 709/204 |
| 6,826,233 B1 * | 11/2004 | Oosawa ................ | 375/240.27 |
| 6,883,141 B2 * | 4/2005 | Negishi et al. .......... | 715/734 |
| 6,934,906 B1 * | 8/2005 | Cheok ................. | 715/500.1 |
| 6,970,513 B1 * | 11/2005 | Puri et al. ............. | 375/240.25 |
| 2003/0043191 A1 * | 3/2003 | Tinsley et al. .......... | 345/762 |

FOREIGN PATENT DOCUMENTS

| | | |
|---|---|---|
| EP | 1037134 | 9/2000 |
| JP | 11-32312 | 2/1999 |
| JP | 2001-243044 | 9/2001 |

(Continued)

OTHER PUBLICATIONS

Todesco, G. et al., "MPEG-4 Support to Multiuser Virtual Environments", Distributed Computing Systems, 2000, Proceedings, 20th International Conference on Taipei, Tawain, Apr. 10-13, 2000, Los Alamitos, CA, IEEE Comput. Soc., US, Apr. 10, 2000, pp. 72-79.

(Continued)

*Primary Examiner*—David A. Wiley
*Assistant Examiner*—Boris Pesin
(74) *Attorney, Agent, or Firm*—Staas & Halsey LLP

(57) ABSTRACT

An MPEG data receiving apparatus adapted to interact with a MPEG data providing apparatus. A storage unit stores scene description information (SDI) from a received MPEG stream and a command recognition unit outputs node identification information based on user-selected objects and scene correction commands input by the user. A correcting unit searches for SDI stored in the storage unit corresponding to the scene correction commands and selectively updates the SDI on the object or requests the MPEG stream providing apparatus to update the SDI corresponding to the scene correction commands according to a result of determining whether the SDI corresponding to the scene correction commands exists in the storage unit. Accordingly, interaction between the MPEG data receiving apparatus and the MPEG data providing apparatus is enabled. Effective results are obtainable under a narrow bandwidth environment by reducing an amount of SDI transmitted from the providing apparatus.

14 Claims, 3 Drawing Sheets

FOREIGN PATENT DOCUMENTS

| | | |
|---|---|---|
| JP | 2001-309348 | 11/2001 |
| WO | WO 98/36559 | 8/1998 |
| WO | WO 00/00898 | 1/2000 |
| WO | WO 01/91464 A1 | 11/2001 |

OTHER PUBLICATIONS

Swaminathan, V. et al., "MPEG-J Java Application Engine in MPEG-4", Sao Carlos Federal University, vol. 1, pp. I-44-I-47, May 28-31, 2000.

Singh, G. et al., "Networked Virtual Worlds", Proceedings Computer Animation, XX, XX, Apr. 19, 1995, pp. 44-49.

Waters, et al., "Design of the Interactive Sharing Transfer Protocol", Proceedings, —The Workshop on Enabling Technologies: Infrastructure for Collaborative Enterprises, IEEE Computer Society Press, Los Alamitos, CA, Jun. 18, 1997 (pp. 140-147).

European Office Action issued Nov. 21, 2007 in corresponding European Patent Appl. No. 022589.18.8-2223.

* cited by examiner

US 7,366,986 B2

APPARATUS FOR RECEIVING MPEG DATA, SYSTEM FOR TRANSMITTING/RECEIVING MPEG DATA AND METHOD THEREOF

CROSS-REFERENCE TO RELATED APPLICATIONS

This application claims the benefit of Korean Application No. 2001-86187 filed Dec. 27, 2001, in the Korean Intellectual Property Office, the disclosure of which is incorporated herein by reference.

BACKGROUND OF THE INVENTION

1. Field of the Invention

The present invention relates to a Moving Picture Experts Group (MPEG) system, and in particular to an MPEG data receiving apparatus and an MPEG data transmitting/receiving method for updating scene description information of scene objects.

2. Description of the Related Art

In general, MPEG-4 is an object-oriented coding standard for multimedia. Since there are plural objects within a scene, temporal and spatial positions of the objects must be designated. The MPEG-4 standard, disclosed in October 1998 by the International Organization for Standardization/International Electrotechnical Commission (ISO/IEC), provides functions required for applications of the multimedia as the object-oriented coding standard.

MPEG-4 objects include video objects, audio objects and composite video and graphic objects. The objects may be edited within a scene.

An MPEG-4 scene configuration is composed of various objects and requires elements for synchronizing the objects. In addition, in order to construct and composite a scene and to display the scene on a user's terminal, descriptive information about the temporal and spatial positions and properties of the scene objects is necessary. The descriptive information is called scene description information.

The MPEG-4 standard adopts Binary Format for Scene Description (BIFS) as a format for providing the scene description information. The BIFS combines video and audio objects into a common binary format in order to reduce an amount of necessary information, and supports functions including designation of temporal and spatial positions of the objects or change of behavior of each object, and interaction with a user of the scene description information.

However, BIFS is limited and is not capable of treating or manipulating any object which is not defined in starting scene description information provided by a content provider.

A receiving apparatus of the prior art receives initial screen description information from the content provider. The initial screen description information includes information about the spatial and temporal positions and properties of nodes constituting a screen and information that is updated corresponding to occurring events, i.e., screen correction commands, such as, for example, a node insertion, a node deletion, or a node property (field) correction. For example, the initial screen description information includes information about whether a particular node is operable corresponding to an event, such as, for example, the node insertion, the node deletion, or the node property (field) correction occurring with respect to the particular node. Also, the initial screen description information includes the screen description information corresponding to predetermined events which may occur in the particular node.

According to the prior art, the content provider must transmit a large amount of the initial screen description information to the receiving apparatus; thus, transmission is inefficient in a network environment having a low bandwidth.

SUMMARY OF THE INVENTION

Accordingly, a first object of the present invention is to provide an MPEG data receiving apparatus for interacting with an MPEG data providing apparatus. A second object of the present invention is to provide a system for interactively changing MPEG data. A third object of the present invention is to provide a method of transmitting and/or receiving MPEG data. A fourth object of the present invention is to reduce an amount of initial screen description information which must be transmitted from a content provider. A fifth object of the present invention is to provide a receiving apparatus which interacts with the content provider to obtain screen description information corresponding to an event that occurs with respect to a predetermined node where initial screen description information does not include screen description information corresponding to the occurring event.

Additional objects and advantages of the invention will be set forth in part in the description which follows, and, in part, will be obvious from the description, or may be learned by practice of the invention.

To achieve the above and other objects, according to the one aspect of the present invention, an MPEG data receiving apparatus comprises a storage unit which stores scene description information separated from a received MPEG stream; a command recognition unit which outputs node identification information about user-selected objects and scene correction commands input by a user; and a correcting unit which searches the scene description information stored on the storage unit corresponding to the scene correction commands and the node identification information and selectively performs a process of updating the scene description information on the object or a process of requesting the scene description information corresponding to the scene correction commands from an MPEG providing apparatus according to a result of determining whether the scene description information corresponding to the scene correction commands exists in the storage unit.

The correcting unit may further comprise a node checking unit which checks whether the node identification information corresponds to a node which interacts with the MPEG data providing apparatus to be updated; a storage checking unit which determines whether the scene description information corresponding to the scene correction commands and the node identification information exists in the storage unit; an updating unit which selectively performs the updating process or the requesting process according to the result of the determination; and a transmitting unit which transmits the scene update information including the node identification information to the MPEG data providing apparatus, wherein the updating unit selectively performs the updating process or the requesting process if the node identification information corresponds to a node which interacts with the MPEG data providing apparatus to be updated.

The updating unit updates the scene description information corresponding to the scene correction commands if the scene description information corresponding to the scene correction commands exists in the storage unit and generates the scene update information including the updated scene description information, and the transmitting unit transmits the scene description information to the MPEG data providing apparatus. Otherwise, the updating unit generates the scene update information including the scene correction commands, and the transmitting unit transmits the scene update information to the MPEG data providing apparatus.

In another aspect of the present invention, there is provided a method of transmitting and receiving MPEG data comprising: storing scene description information separated from an MPEG stream received from an MPEG data providing apparatus; inputting node identification information on user selected objects to be updated and scene correction commands designated by a user; searching whether the stored scene description information includes scene description information for updating the user selected objects according to the user input scene correction commands; updating the scene description information of the user selected objects according to the user input scene correction commands, and generating scene update information requesting the node identification information and the updated scene description information for the user selected objects if the scene description information corresponding to the scene correction commands exists in the stored screen description information; and transmitting the generated scene update information to the MPEG data providing apparatus.

The generating of the scene update information may further comprise generating the scene update information requesting the node identification information and scene correction commands, if the scene description information corresponding to the scene correction commands does not exist in the stored screen description information. The method of transmitting and receiving MPEG data may further comprise checking whether the user input node identification information corresponds to a node which interacts with the MPEG data providing apparatus to be updated, and searching the stored scene description information only if the node identification information is determined as corresponding to the node which interacts with the MPEG data providing apparatus to be updated.

BRIEF DESCRIPTION OF THE DRAWINGS

The above objects and advantages of the present invention will become more apparent by describing in detail embodiments thereof with reference to the accompanying drawings, in which.

DESCRIPTION OF THE PREFERRED EMBODIMENT

Figure 1:
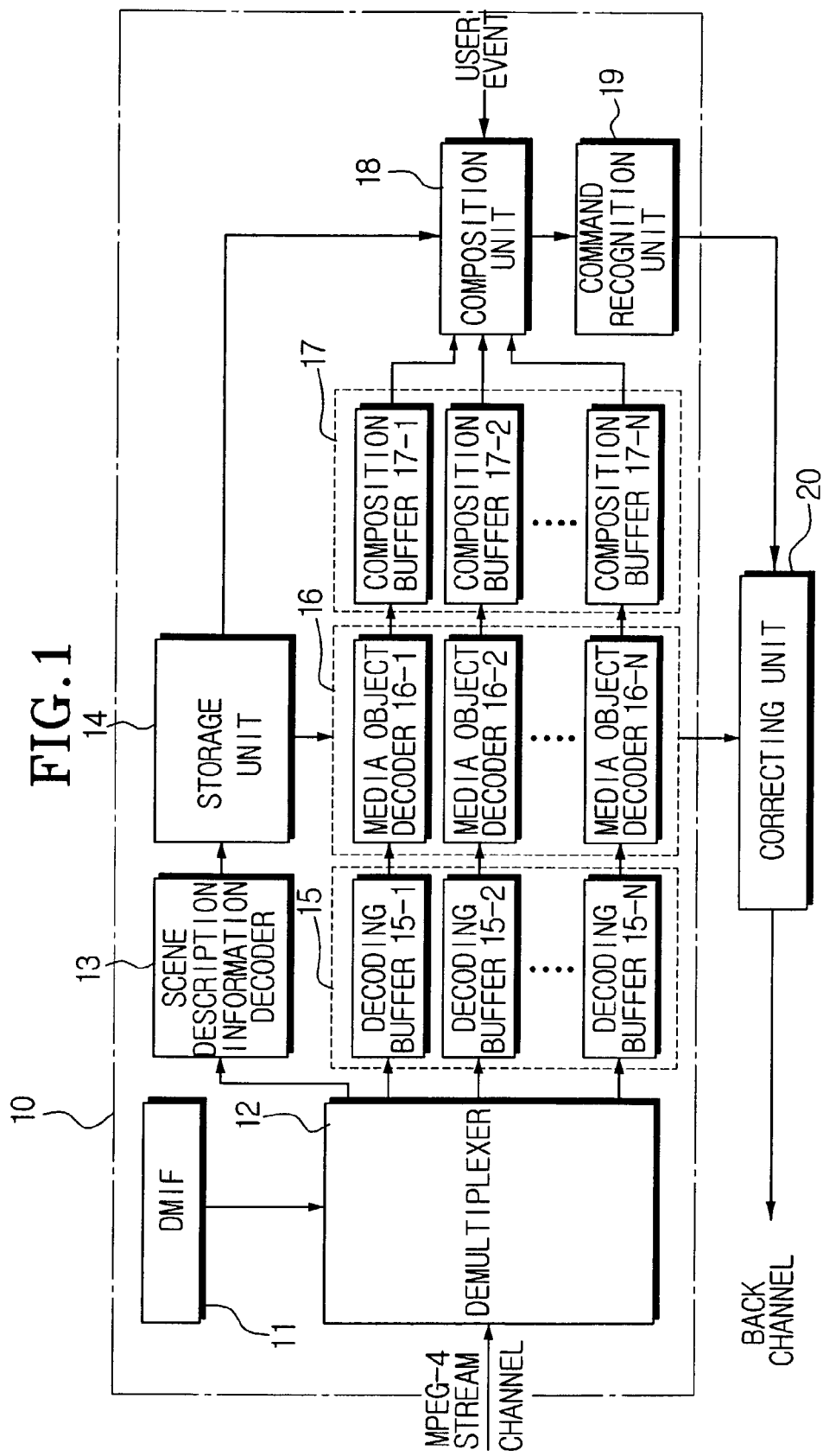
FIG. 1 is a block diagram of a system for receiving MPEG-4 data according to the present invention.

Reference will now be made in detail to the present embodiments of the present invention, examples of which are illustrated in the accompanying drawings, wherein like reference numerals refer to like elements throughout.

FIG. 1 is a block diagram showing a configuration of an MPEG-4 data receiving apparatus according to an embodiment of the present invention. The MPEG data receiving apparatus comprises a general MPEG system 10 and a correcting unit 20.

The general MPEG system 10 comprises a Delivery Multimedia Integration Framework (DMIF) manager 11, a demultiplexer 12, a scene description information decoder 13, a storage unit 14, a plurality of decoding buffers 15 comprising decoding buffers 15-1 through 15-N, a plurality of media object decoders 16 comprising media object decoders 16-1 through 16-N, a plurality of composition buffers 17 comprising composition buffers 17-1 through 17-N, a composition unit 18, and a command recognition unit 19.

An MPEG stream transmitted from a server through a DMIF application interface is demultiplexed by the demultiplexer 12 managed by the DMIF manager 11.

The scene description information decoder 13 decodes data of the scene description information from the demultiplexed stream. The decoded scene description information data are stored in the storage unit 14 as a scene graph, namely a scene tree structure.

The scene graph is a tree, which represents a scene using object layers identified as nodes. The scene comprises group nodes and child nodes. A role of the group nodes is to define layer and spatial organization of the scene. The child nodes are the branches and leaves of the tree. The nodes define geometrical objects, optical sources and various types of sensors. The group nodes organize the child nodes. A child node may also function as a group node. Every node may have a feature identified as a field, and the field may be one of a plurality of types.

For example, a sphere as a geometrical node has a field for defining a radius of the sphere. A transform node has a rotation field for defining a rotation angle. Coding of a node is performed in a depth-first scheme similar to a text-based Virtual Reality Modeling Language (VRML) file. Coding of a node field is performed in an index-based scheme. Each coded node is allocated to a typical integer number as node identification information. The node identification information is predetermined by a provider and transmitted to the receiving apparatus.

Each object stream, such as, for example, video, audio, etc., is input to a corresponding one of the decoding buffers 15-1 through 15-N, and the input buffered data are decoded by a corresponding one of the media object decoders 16-1 through 16-N within a predetermined time. The decoded data are composited with previously stored data in a corresponding one of the composition buffers 17-1 through 17-N.

The composition unit 18 composites and renders the decoded visual and/or auditory object data and the scene description information to a single unit. That is, the composition unit 18 displays videos on a user's monitor or outputs sounds through speakers of the receiving apparatus.

The command recognition unit 19 outputs node identification information of user selected objects to the correcting unit 20 based on contents output from the composition unit 18 and scene correction commands input by the user.

Figure 2:
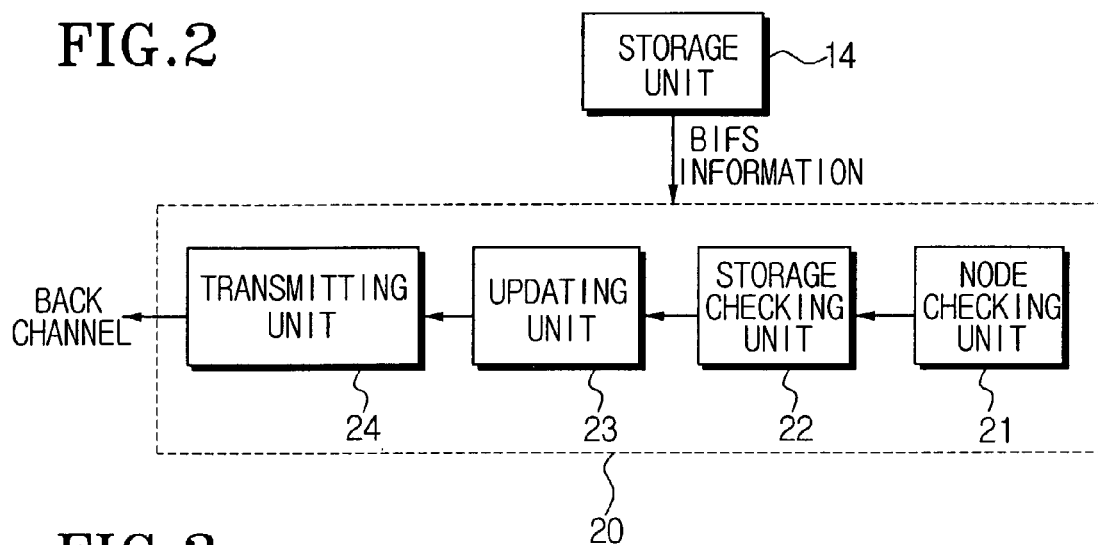
FIG. 2 is a detailed block diagram of the correcting unit shown in FIG. 1.

Referring now to FIG. 2, the correcting unit 20 comprises a node checking unit 21, a storage checking unit 22, an updating unit 23 and a transmitting unit 24. The node checking unit 21 checks whether the node identification information output by the command recognition unit 19 corresponds to a node which interacts with a providing apparatus (not shown) to be updated. If the node identification information corresponds to the interacting node, the node checking unit 21 transmits the node identification information and scene correction commands to the storage checking unit 22. Examples of the scene correction commands are, for example, to insert, remove or correct the node field in a scene.

The storage checking unit 22 checks whether the scene description information corresponding to the scene correction commands exists within the scene tree structure stored in the storage unit 14. If the scene description information corresponding to the scene correction commands exists within the scene tree structure stored in the storage unit 14, the updating unit 23 updates the scene description information. The transmitting unit 24 transmits the updated scene description information and node identification information to the providing apparatus.

When a user event (screen correction command) occurs with respect to a node due to an input by a user, the node checking unit 21 checks whether the node is operable corresponding to the occurring event (screen correction command) based on the initial screen description information stored in the storage unit 14. For example, when a user event of inserting a node 2 into a node 1 occurs, the node checking unit 21 checks whether there is "node insertion" information among the screen description information of the node 1 stored in the storage unit 14. If the node checking unit 21 determines that there is no "node insertion" information stored in the storage unit 14, a further system operation is not performed. If the node checking unit 21 determines that there is "node insertion" information stored in the storage unit 14, operation of the system advances to the storage checking unit 22.

The storage checking unit 22 checks whether the screen description information corresponding to the occurring event (screen correction command) exists in a screen tree structure stored in the storage unit 14. For example, the storage checking unit 22 checks if the node 2 corresponding to the occurring event (screen correction command) of inserting the node 2 into the node 1 exists in the tree structure of the node 1 stored in the storage unit 14.

An updating unit 23 updates the screen description information if the screen description information corresponding to the occurring event (screen correction command) exists in the storage unit 14. The updated screen description information is transmitted to the provider through a transmitting unit 24. However, if no screen description information corresponding to the occurring event (screen correction command) exists, the receiving apparatus requests the provider (not shown) to transmit updated screen description information. That is, the updating unit 23 transmits screen updating information including identification information of the node where the event occurs and the screen description information corresponding to the occurring event (screen correction command). In response, the provider updates the screen description information of the node corresponding to the occurring event (screen correction command) and transmits the updated information to the receiving apparatus. For example, if the node 2 exists in the tree structure of the node 1 stored in the storage unit 14, the updating unit 23 updates the screen description information of the node 1 according to the occurring event, and transmits the updated screen description information to the provider. However, if the node 2 does not exist in the tree structure of the node 1, the updating unit 23 transmits updating information to the provider screen including identification information of the node 1 and information corresponding to the event of inserting the node 2 into the node 1 using the transmitting unit 24. In response to the transmission by the transmitting unit 24, the provider (not shown) transmits the updated screen description information, i.e., updated screen description information for the node 1 to which the node 2 is inserted to the receiving apparatus.

In summary, if the scene description information corresponding to the scene correction commands does not exist within the scene tree structure stored in the storage unit 14, the updating unit 23 generates scene update information, which requests scene description information corresponding to the node identification information and scene correction commands from the providing apparatus. The transmitting unit 24 transmits the scene update information including the node identification information and scene correction commands to the providing apparatus. At this time, the providing apparatus may update the scene description information corresponding to the scene correction commands.

Figure 3:
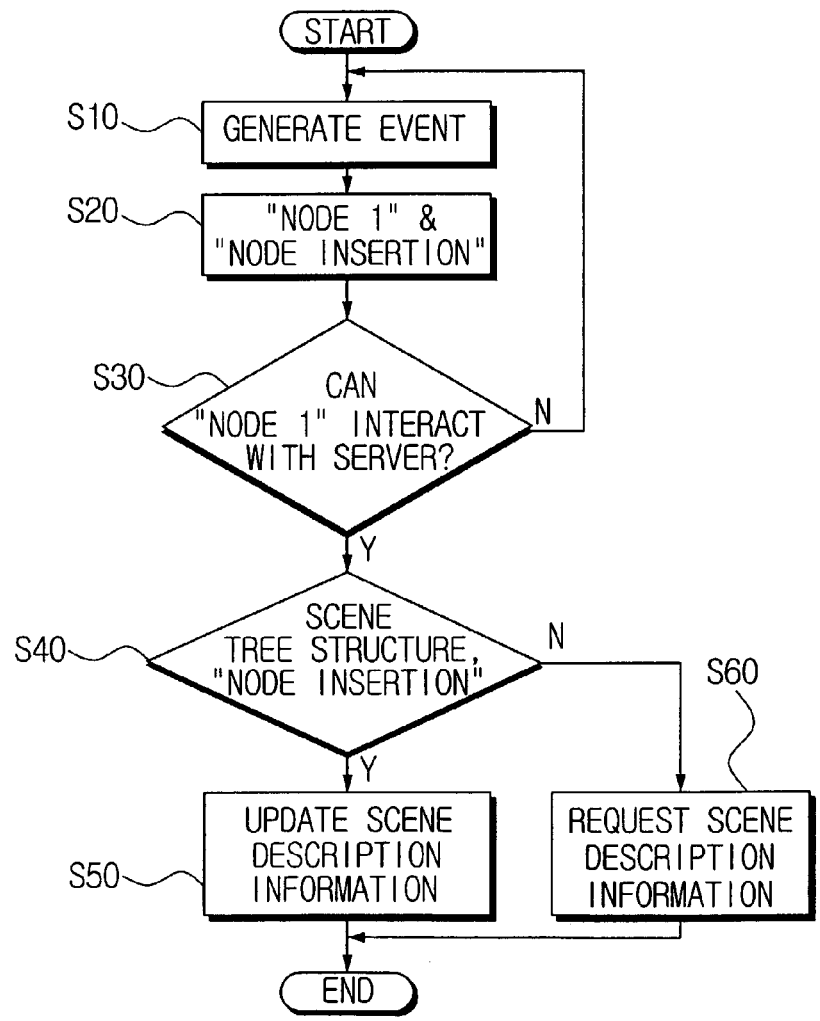
FIG. 3 is a flow chart of a method of interaction between a server and a client in the MPEG-4 system of FIG. 1.
Figure 4:
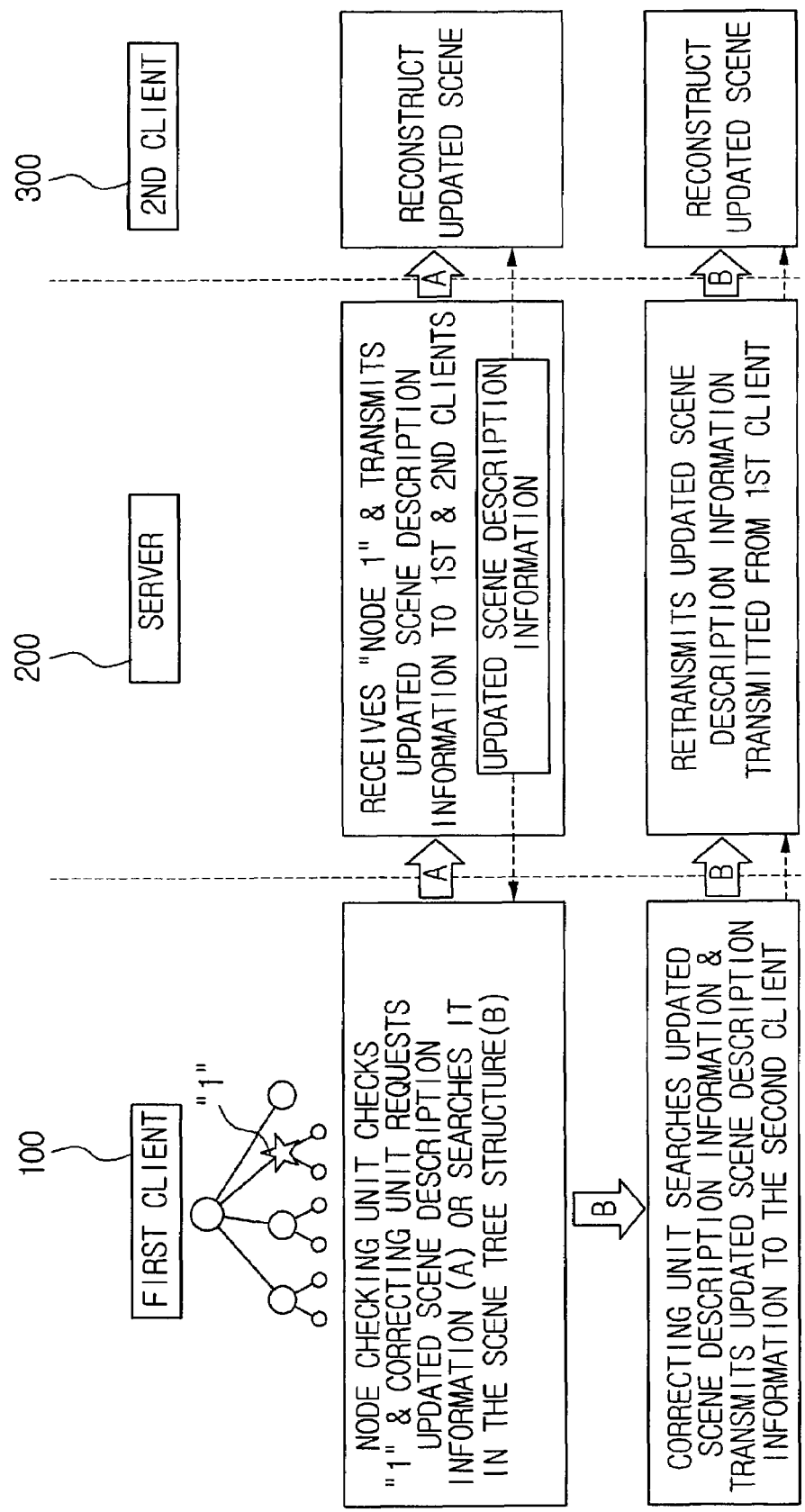
FIG. 4 is a conceptual diagram of interaction between a server and a plurality of clients.

A method of transmitting/receiving MPEG data between a plurality of clients, such as for example, first and second clients 100 and 300, respectively, as receiving apparatuses and a server 200 as a providing apparatus is described below with reference to FIGS. 3 and 4.

The first and second clients 100 and 300, respectively, receive a starting scene from the server 200. The first client 100 generates an event such as a click of mouse at operation S10. The command recognition unit 19 outputs the node identification information of an object on which the event occurs in the first client 100 and a scene correction command is input in the first client at operation S20. For example, the command recognition unit 19 outputs the node identification information, such as, for example, "node 1" and the scene correction command, such as for example, "node insertion."

The node checking unit 21 checks whether the "node 1" is adapted to interact with the server 200 to be updated at operation S30. If the node 1 is adapted to interact with the server 200, the event information of the "node 1" and "node insertion" is transmitted to the storage checking unit 22. At operation S40, the storage checking unit 22 checks whether the scene description information of the "node insertion" exists in the scene tree structure of the starting scene description information stored in the storage unit 14. If the scene description information exists in the scene tree structure at the operation S40, the updating unit 23 updates the scene description information to correspond with the insertion of the "node 1" at operation S50, and generates scene update information including the "node 1" and the "node insertion" command. The scene update information is transmitted to the server 200 via the transmitting unit 24. The server 200 transmits the scene update information provided from the first client 100 to the second client 300 (path B in FIG. 4).

If the scene description information does not exist in the scene tree structure at the operation S40, the updating unit 23 generates the scene update information to request the scene description information on the "node insertion" of the "node 1" from the server 200 at operation S60. The scene update information is multiplexed through the transmitting unit 24 for transmission to the server 200 (path A in FIG. 4). The server 200 updates the scene description information to incorporate the insertion of "node 1" according to the "node insertion" command and the transmitted scene update information. Then, the server 200 transmits the updated scene description information to the first and second clients 100 and 300, respectively (path A in FIG.4).

The updated scene description information transmitted to the first and second clients 100 and 300, respectively, from the server 200 is reconstructed on the displaying unit such as a monitor by each MPEG data receiving apparatus.

The method of transmitting/receiving MPEG data according to the present invention is explained using the first and second clients 100 and 300, respectively, and the server 200. However, interaction between the server and a plurality of more than two clients is obtainable using the present invention. When clients in addition to the first and second clients 100 and 300, respectively, are to be updated according to user input at the client 100, the server 200 transmits the appropriate scene update commands or the updated scene description information to each of the additional clients in a similar manner as in the transmission of the update commands and the updated scene description information from the server 200 to the client 300.

As described above, data transmitting and receiving between a client and a server can be actively achieved.

According to the present invention, the scene description information on the received MPEG stream may be updated according to the user's event. If the scene description information is not updated, the scene update information may be provided to the MPEG stream providing apparatus, received from the MPEG stream providing apparatus and then updated. Therefore, mutual receiving and transmitting MPEG data may be accomplished.

The effective results are obtainable under a narrow bandwidth environment by reducing an amount of the starting scene description information transmitted from the providing apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for receiving MPEG data, comprising:
   a storage unit which stores scene description information separated from data received from an MPEG data provider and corresponding to scene objects;
   a command recognition unit which outputs node identification information for one of the scene objects selected by a user, the output based on a scene correction command input by the user; and
   a correcting unit which
      determines whether the stored scene description information includes information for updating the user selected scene object based on the output scene correction command and the output node identification information,
      updates the scene description information for the user selected object, when the stored scene description information includes information for updating the user selected scene object based on the output scene correction command and the output node identification information, and
      requests the MPEG data provider to provide updated scene description information for the user selected scene object based on the output scene correction command and the output node identification information according to the determination, when the stored scene description information does not include information for updating the user selected scene object based on the output scene correction command and the output node identification information.

2. The apparatus according to claim 1, wherein the correcting unit comprises:
   a storage checking unit which checks the storage unit to make the determination;
   an updating unit which selectively performs the updating process or the requesting process according to the determination; and
   a transmitting unit which transmits the updated scene description information or the request for updated scene description information to the MPEG data provider in response to the determination.

3. The apparatus according to claim 2, wherein the updating unit updates the scene description information for the user selected scene object if the information for updating the user selected scene object exists in the stored scene description information.

4. The apparatus according to claim 2, wherein:
   the updating unit generates the request for scene update information including the scene correction commands if the information for updating the scene description information for the selected scene object, when the scene correction command does not exist in the stored scene description information.

5. The apparatus according to claim 2, wherein:
   the correcting unit further comprises a node checking unit which checks whether the node identification information corresponds to a node which interacts with the MPEG data provider to be updated, and
   the updating unit selectively performs the updating process or the requesting process, if the output node identification information is determined as corresponding to the interactive node.

6. A system for transmitting and receiving MPEG data comprising:
   an MPEG data providing apparatus which provides an MPEG data stream; and
   a plurality of MPEG data receiving apparatuses, each MPEG data receiving apparatus comprising:
      a storage unit which stores scene description information separated from the MPEG data;
      a command recognition unit which outputs node identification information on user selected objects of the MPEG data and user input scene correction commands corresponding to the selected objects; and
      a correcting unit which
         searches the storage unit based on the scene correction commands and the node identification information,
         updates the scene description information on the selected objects, when the stored scene description information includes information for updating the selected objects according to the scene correction, and
         requests the MPEG data providing apparatus to provide updated scene description information corresponding to the scene correction commands, when the stored scene description information does not include information for updating the selected objects according to the scene correction commands,
      wherein the MPEG data providing apparatus transmits the updated scene description or the requested scene description information provided by one of the plurality of the MPEG data receiving apparatuses to at least one other of the plurality of the MPEG data receiving apparatuses.

7. The system for transmitting and receiving MPEG data according to claim 6, wherein the correcting unit comprises:
   a storage checking unit which checks the storage unit to make the determination whether the stored scene description information includes information for updating the selected objects according to the scene correction commands;

an updating unit which selectively performs the updating process or the requesting process in response to the determination; and a transmitting unit which transmits a result of the selectively performed process to the MPEG data providing apparatus.

8. The system for transmitting and receiving MPEG data according to claim 7, wherein:

the updating unit updates the scene description information corresponding to the scene correction commands if the scene description information corresponding to the scene correction commands exists; and the transmitting unit transmits the updated scene description information to the MPEG data providing apparatus.

9. The system for transmitting and receiving MPEG data according to claim 7, wherein:

the updating unit generates a request for the MPEG data providing apparatus to provide the updated scene description information corresponding to the scene correction commands if the stored scene description information does not include information for updating the selected objects according, and the transmitting unit transmits the request for the updated scene description information to the MPEG data providing apparatus.

10. The system for transmitting and receiving MPEG data according to claim 7, wherein:

the correcting unit further comprises a node checking unit which checks whether the node identification information on each user selected object corresponds to a node which interacts with the MPEG data providing apparatus to be updated, and the updating unit selectively performs the updating process or the requesting process, if the node identification information is determined as corresponding to the node which interacts with the MPEG data providing apparatus to be updated.

11. The system for transmitting and receiving MPEG data according to claim 6, wherein the MPEG data providing apparatus transmits the updated scene description information to at least another one of the MPEG data receiving apparatuses if the MPEG data providing apparatus receives the updated scene description information from the one of the plurality of MPEG data receiving apparatuses.

12. The system for transmitting and receiving MPEG data according to claim 6, wherein the MPEG data providing apparatus transmits the requested scene description information to the one of the plurality of MPEG data receiving apparatuses and to at least another one of the plurality of MPEG data receiving apparatuses if the MPEG data providing apparatus is requested by the one of the plurality of MPEG data receiving apparatuses to transmit the scene description information.

13. A method of transmitting and receiving MPEG data, comprising:

storing scene description information separated from received MPEG data in a storage unit;

receiving node identification information and scene correction commands for an object;

searching the stored scene description information to determine whether the scene description information corresponding to the scene correction commands and node identification information for the object exists in the stored scene description information;

updating the scene description information corresponding to the scene correction commands, generating scene update information including the node identification information and the updated scene description information, when the scene description information corresponding to the scene correction commands exists in the stored scene description information, and requesting the node identification information and scene correction commands, when the scene description information corresponding to the scene correction commands does not exist in the stored scene description information; and transmitting the generated scene update information to an MPEG data providing apparatus.

14. The method of transmitting and receiving MPEG data according to claim 13, further comprising:

checking whether the node identification information corresponds to a node which interacts with the MPEG data providing apparatus to be updated before searching the stored scene description information.

* * * * *

UNITED STATES PATENT AND TRADEMARK OFFICE
CERTIFICATE OF CORRECTION

PATENT NO. : 7,366,986 B2 Page 1 of 1
APPLICATION NO. : 10/305185
DATED : April 29, 2008
INVENTOR(S) : Sang-rae Lee It is certified that error appears in the above-identified patent and that said Letters Patent is hereby corrected as shown below:

On the title page item (56), Column 2 (Other Publications), Line 3, change "Tawain," to --Taiwan,--.

Signed and Sealed this

Twenty-third Day of September, 2008

JON W. DUDAS
*Director of the United States Patent and Trademark Office*